United States Patent
Wang et al.

(10) Patent No.: US 10,785,792 B2
(45) Date of Patent: Sep. 22, 2020

(54) USER DEVICE-INITIATED LOW-LATENCY DATA TRANSMISSIONS

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 13 days.

(21) Appl. No.: 15/939,088

(22) Filed: Mar. 28, 2018

(65) Prior Publication Data

US 2019/0306877 A1    Oct. 3, 2019

(51) Int. Cl.
*H04W 72/14* (2009.01)
*H04W 72/04* (2009.01)
*H04W 72/12* (2009.01)
*H04L 5/14* (2006.01)
*H04L 5/00* (2006.01)
*H04L 1/18* (2006.01)

(52) U.S. Cl.
CPC ........... *H04W 72/14* (2013.01); *H04L 5/0042* (2013.01); *H04L 5/0044* (2013.01); *H04L 5/0053* (2013.01); *H04L 5/0064* (2013.01); *H04L 5/0087* (2013.01); *H04L 5/0094* (2013.01); *H04W 72/0413* (2013.01); *H04W 72/1278* (2013.01); *H04L 1/1812* (2013.01); *H04W 72/1242* (2013.01)

(58) Field of Classification Search
None
See application file for complete search history.

(56) References Cited

U.S. PATENT DOCUMENTS

| | | | |
|---|---|---|---|
| 2013/0188552 A1* | 7/2013 | Kazmi | H04W 76/15 370/315 |
| 2015/0098412 A1* | 4/2015 | Yerramalli | H04W 74/0808 370/329 |
| 2015/0195849 A1* | 7/2015 | Bashar | H04W 72/1215 370/330 |
| 2016/0113008 A1 | 4/2016 | Damnjanovic et al. | |
| 2016/0212625 A1* | 7/2016 | Damnjanovic | H04W 74/0875 |
| 2016/0366704 A1 | 12/2016 | Lee et al. | |
| 2017/0111886 A1* | 4/2017 | Kim | H04W 48/14 |
| 2017/0135084 A1 | 5/2017 | Kuchibhotla et al. | |
| 2017/0150424 A1 | 5/2017 | Lee et al. | |
| 2017/0164377 A1* | 6/2017 | Ho | H04W 16/28 |

(Continued)

FOREIGN PATENT DOCUMENTS

WO    2017002987    1/2017

OTHER PUBLICATIONS

"Superposed transmission of pre-emption indication with eMBB data", 3GPP TSG RAN WG1 NR Ad Hoc Meeting R1-1711428, Qingdao, China, Jun. 27-30, 2017, Jun. 27, 2017-Jun. 30, 2017, 4 pages.

(Continued)

*Primary Examiner* — Lonnie V Sweet
(74) *Attorney, Agent, or Firm* — Colby Nipper PLLC

(57) ABSTRACT

The present disclosure describes techniques and systems for user device-initiated low-latency data transmissions to reduce a latency in transmitting low-latency data. These techniques may include a user device that autonomously determines to transmit low-latency data, then transmits the low-latency data over one or more resources of a wireless network for which transmission of the low-latency data is not scheduled.

20 Claims, 9 Drawing Sheets

(56) References Cited

U.S. PATENT DOCUMENTS

| | | | |
|---|---|---|---|
| 2018/0027576 A1 | 1/2018 | Kowalski et al. | |
| 2018/0070341 A1* | 3/2018 | Islam et al. | |
| 2018/0359711 A1* | 12/2018 | Akkarakaran | H04W 52/325 |
| 2018/0368169 A1* | 12/2018 | Jung | H04L 41/08 |
| 2018/0376428 A1* | 12/2018 | Lin | H04W 72/0473 |
| 2019/0098612 A1* | 3/2019 | Babaei | H04W 72/042 |
| 2019/0159136 A1* | 5/2019 | MolavianJazi | H04W 52/08 |
| 2020/0008216 A1* | 1/2020 | Iyer | H04W 72/1242 |

OTHER PUBLICATIONS

"International Search Report and Written Opinion", PCT Application No. PCT/US2019/012790, dated Apr. 4, 2019, 15 pages.

"On eMBB and URLLC Uplink Multiplexing", 3GPP TSG RAN WG1 Meeting #92 Athens, Greece, Feb. 26-Mar. 2, 2018, 2018, 3 pages.

"On UL Multiplexing Between eMBB and URLLC", 3GPP TSG-RAN WG1 Meeting #92 Athens, Greece, Feb. 26-Mar. 2, 2018, 2018, 6 pages.

"On UL Multiplexing of Transmissions with Different Reliability Requirements", 3GPP TSG RAN WG1 Meeting #92 Athens, Greece, Feb. 26-Mar. 2, 2018, 2018, 4 pages.

"International Preliminary Report on Patentability", PCT Application No. PCT/US2019/012790, dated Mar. 2, 2020, 14 pages.

"On Pre-emption Indication for Uplink", 3GPP TSG RAN WG1 NR Ad-Hoc#2, R1-1711514, Qingdao, P.R. China, Jun. 27-30, 2017, 2 pages.

\* cited by examiner

USER DEVICE-INITIATED LOW-LATENCY DATA TRANSMISSIONS

BACKGROUND

Generally, wireless communication is controlled by a provider of a wireless network. For a user device to transmit data to a base station of the wireless network, the device first requests an uplink grant. The base station then transmits an uplink grant to the user device, with the uplink grant identifying resources over which the user device can transmit the data. This process allows the base station to manage resources of the wireless network in a manner that avoids interference among connected wireless devices.

SUMMARY

This document describes techniques for, and systems that enable, user device-initiated low-latency data transmissions. Low-latency data can include data for which a delay, caused by an uplink grant request process, is not tolerable. For example, low-latency data may include controls for an unmanned aircraft system, a driverless automobile, a missile intercept, or a remote surgical robot. Other low-latency data may include user device status updates or other control data for the wireless connection. For a user device-initiated low-latency data transmission, the user device transmits the low-latency data without receiving an uplink grant for transmission of the low-latency data. By allowing the base station to transmit the low-latency data without an associated uplink grant, a delay between determining to transmit and beginning to transmit is reduced or avoided. In some implementations, the user device transmits the low-latency data using resources of the wireless connection that were granted for transmission of other data. The user device may also transmit a preemption indication to indicate to a base station that the low-latency data is transmitted without an associated uplink grant.

In some aspects, a user device establishes, via a transceiver of the user device, a wireless connection with a base station. The user device receives, via the transceiver, an uplink grant for transmitting first data via resources of the wireless connection. Second data, which is not included in the first data, is determined by the user device to be low-latency data. The user device then selects, for transmission of the second data, one or more orthogonal frequency-division multiplexing (OFDM) symbols of the resources. The one or more OFDM symbols had previously been scheduled for transmission of a portion of the first data. The user device then transmits, via the transceiver, the second data over the selected one or more OFDM symbols.

In other aspects, a user device performs user device-initiated low-latency data transmissions. The user device includes a processor, a hardware-based transceiver, and a computer-readable storage medium storing instructions that can be executed by the processor to perform operations for user device-initiated low-latency data transmissions. When performing the operations, the user device identifies first data for transmitting to a base station of a wireless device. The user device then requests, via the hardware-based transceiver, an uplink grant from the base station. An uplink grant is received by the user device, which uplink grant identifies resources of the wireless connection for transmitting the first data. The user device identifies second data for transmitting to the base station, with the second data being low-latency data and not included in the first data. One or more of OFDM symbols are selected, for transmitting the second data, by the user device. The user device then transmits, via the hardware-based transceiver, the second data over the selected one or more OFDM symbols. The transmission of the second data preempts transmission of a portion of the first data over the selected one or more OFDM symbols.

In further aspects, a user device establishes a wireless connection with a base station of a wireless network. The user device determines that first data is low-latency data, with the first data being unscheduled for transmission to the base station. Resources of the wireless network, over which the user device can preempt a transmission of second data, are identified by the user device. The user device then transmits the first data within the identified resources of the wireless network.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of user device-initiated low-latency data transmissions for wireless networks is described below. The use of the same reference numbers in different instances in the description and the figures indicate similar elements.

DETAILED DESCRIPTION

Figure 1:
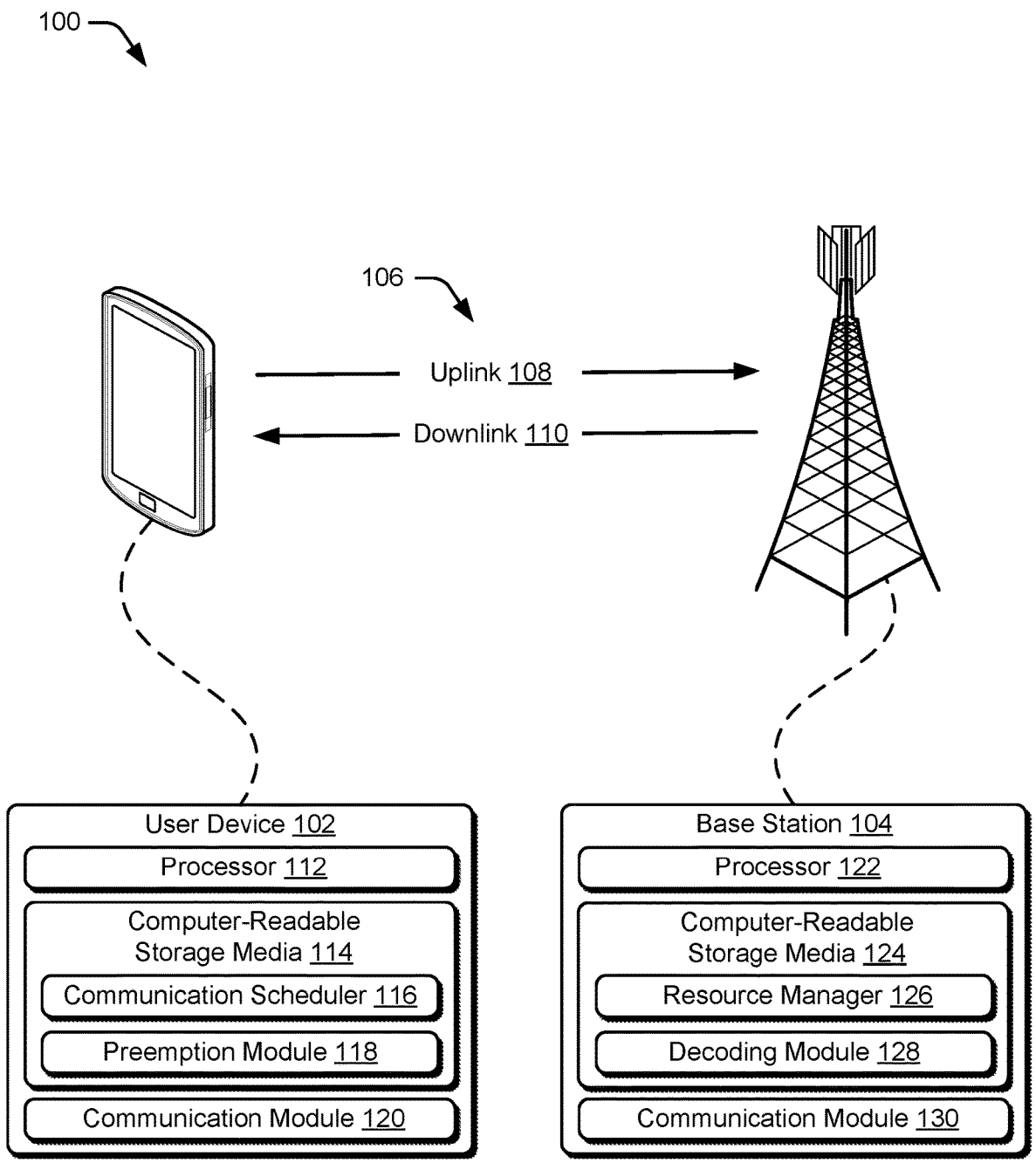
FIG. 1 illustrates example device configurations of a user device and a base station in accordance with one or more aspects of user device-initiated low-latency data transmissions.

Base stations of wireless networks manage wireless connections with user devices by allocating portions of bandwidth to the user devices. The base stations schedule transmissions of data by a user device through a process including receiving a request for an uplink grant from the user device, determining resources to allocate to the transmission, and transmitting the uplink grant to the user device. The user device then waits for the allocated resources, which include a time component, to transmit the data. In some instances, and for some types of data to be transmitted, this process may create an intolerable delay, or latency, between the user device determining to transmit the data and the beginning transmission of the data.

This document describes techniques and systems for user device-initiated low-latency data transmissions to reduce a latency in transmitting low-latency data. These techniques may include a user device that identifies low-latency data for transmission, then transmits the low-latency data over one or more resources of a wireless network for which transmission of the low-latency data is not scheduled. The resources may be allocated to the user device for transmission of other data, such as data for which an uplink grant was previously requested by the user device, a random access channel transmission, or a physical uplink control channel transmission. Alternatively, the resources may be unallocated resources of the wireless network or allocated to a wireless connection with another user device. By allowing the base station to transmit the low-latency data without a delay from a scheduling process, a latency for transmitting the low-latency data is reduced.

In an illustrative example, a pilot operates a user device to control an unmanned aircraft. The user device communicates with the unmanned aircraft via a wireless connection of a wireless network. The user device provides an indication of a status of the unmanned aircraft, via a radar or a video feed, which is received over the wireless connection. If the pilot notices a need for evasive action, a delay in transmitting controls for the evasive action may not be tolerable. For example, if a bird, a projectile, or another unmanned aircraft approaches the unmanned aircraft, the delay in transmitting controls may result in a collision and a loss of the unmanned aircraft. In this scenario, techniques for user device-initiated low-latency data transmissions may be implemented to transmit the controls for evasive action over resources of the wireless network that are not allocated for the transmission. The techniques included determining, by the user device, that the controls for evasive action are low-latency data. The user device then selects, for transmission of the controls, resources of the wireless network that have been scheduled for transmission of other data of the wireless connection. By transmitting the controls instead of the other data, the user device is able to reduce a latency between determining to transmit the controls and actually transmitting them.

The following discussion describes an operating environment and techniques that may be employed in the operating environment and/or network environment. In the context of the present disclosure, reference is made to the operating environment or networking environment by way of example only.

Operating Environment

FIG. 1 illustrates an example operating environment 100 in which devices for user device-initiated low-latency data transmissions can be implemented. In this example, the operating environment includes a user device 102 and a base station 104 that are respectively configured to communicate over a wireless connection 106 of a wireless network. Generally, the wireless connection 106 includes an uplink 108 by which the user device 102 transmits data to the base station 104 and a downlink 110 by which the base station 104 transmits other data to the user device 102, such as grants for further communications. Although shown or described with reference to a separate uplink 108 or downlink 110, communication between the user device 102 and base station 104 may also be referenced as a wireless association, a frame exchange, a wireless link, or a communication link.

The wireless connection 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, a long-term evolution (LTE) protocol, an LTE Advanced protocol, a 5G NR protocol, or a future advanced protocol. The protocol may operate based on frequency division duplexing (FDD) or time division duplexing (TDD). The wireless connection 106 may operate over a high bandwidth, such as a bandwidth greater than 1 GHz. Further, the wireless connection 106 may be configured to allow for operation at high frequencies, such as frequencies above 3 GHz, as well as lower frequencies, such as those between 0.5 GHz and 3 GHz.

The user device 102 includes a processor 112, computer-readable storage media 114 having a communication scheduler 116 and a preemption module 118, and a communication module 120. The user device 102 is illustrated as a smart phone, however the user device 102 may instead be implemented as any device with wireless communication capabilities, such as a mobile gaming console, a tablet, a laptop, an advanced driver assistance system (ADAS), a point-of-sale (POS) terminal, a health monitoring device, an unmanned aircraft, a camera, a media-streaming dongle, a wearable smart-device, an internet-of-things (IoT) device, a personal media device, a navigation device, a mobile-internet device (MID), a wireless hotspot, a femtocell, a smart vehicle, or a broadband router.

The processor 112 of the user device 102 can execute processor-executable instructions or code stored by the computer-readable storage media (CRM) 114 to cause the user device 102 to perform operations or implement various device functionalities. In some cases, the processor 112 is implemented as an application processor (e.g., multicore processor) or a system-on-chip with other components of the user device 102 integrated therein. The CRM 114 may include any suitable type of memory media or storage media, such as read-only memory (ROM), programmable ROM (PROM), random access memory (RAM), static RAM (SRAM), or Flash memory. In the context of this discussion, the CRM 114 of the user device 102 is implemented as hardware-based storage media, which does not include transitory signals or carrier waves. In some cases, the CRM 114 stores one or more of firmware, an operating system, or applications of the user device 102 as instructions, code, or information. The instructions or code can be executed by the processor 112 to implement various functionalities of the user device 102, such as those related to network access or audio encoding features. In this example, the CRM 114 also stores processor-executable code or instructions for implementing one or more of the communication scheduler 116 or the preemption module 118 of the user device 102.

In some aspects, the communication scheduler 116 identifies data for transmitting to, or requesting from, the base station 104. The communication scheduler 116 then requests, from the base station 104, a grant for communication resources to communicate over the uplink 108 or the downlink 110. For example, the communication scheduler 116 causes the user device 102 to transmit, via a physical uplink control channel (PUCCH), a request for an uplink grant identifying allocated resources to transmit application data to the base station 104. The communication scheduler 116 may also identify data as low-latency data, standard data, or high-latency data.

The preemption module 118 can determine if transmission of low-latency data should be scheduled preempt transmission of other data. For example, the preemption module 118 can determine that the communication scheduler 116 has requested, or received, an uplink grant for transmitting other data, such as standard data or high-latency data. The preemption module 118 selects, for transmission of the low-latency data, resources identified in the uplink grant for transmission of the other data. The selected module may include one or more OFDM symbols, resource blocks, or subcarriers. The preemption module 118 may also prepare, or cause to be prepared, a preemption indication to transmit to the base station 104. The preemption indication may indicate over which OFDM symbols, subcarriers, resource elements, or spatial layers the low-latency data is transmitted. Additionally, the preemption indication can be transmitted before, during, or after the low-latency data is transmitted.

The request for the uplink grant is transmitted to the base station 104 using the communication module 120. The communication module 120 of the user device 102 includes a hardware-based transceiver and associated circuitry or other components for communicating with the base station 104 via a wireless medium. For example, the communication module 120 may transmit, via a transmitter of the transceiver, data to the base station 104 via one or more channels of the uplink 108. This data transmitted to the base station 104 may include any suitable type of framed or packetized information, such as a device location, a sounding reference signal (SRS), a PRACH communication, device status information, wireless connection status information, wireless connection control information, data requests, application data, or network access requests. The communication module 120 may also receive, via a receiver of the transceiver, other data from the base station 104, such as application data, downlink pilots, primary or secondary synchronization signals (PSSs or SSSs), a master information block (MIB), a system information block (SIB), a downlink grant, an uplink grant, wireless connection configuration settings, network control information, or a communication mode selection.

In this example, the base station 104 is shown generally as a cellular base station of a wireless network. The base station 104 may be implemented to manage a cell of a wireless network that includes multiple other base stations that each manage another respective cell of the wireless network. As such, the base station 104 may communicate with a network management entity or others of the multiple base stations to coordinate connectivity or hand-offs of mobile stations within or across the cells of the wireless network.

The base station 104 can be configured as any suitable type of base station or network management node, such as a Global System for Mobile Communications (GSM) base station, a node base (Node B) transceiver station (e.g., for UMTS), an evolved NodeB (eNB, e.g., for LTE), or a next generation Node B (gNB, e.g., for 5G NR). As such, the base station 104 may control or configure parameters of the uplink 108 or the downlink 110 in accordance with one or more of the wireless standards or protocols described herein.

The base station 104 includes a processor 122, a computer-readable storage media (CRM) 124 having a resource manager 126 and a decoding module 128, and a communication module 130. The processor 122 can execute processor-executable instructions or code stored by the CRM 124 to perform operations or implement various base station functionalities. In some cases, the processor 122 is implemented as multiple processor cores or a multicore processor configured to execute firmware or an operating system of the base station 104. The CRM 124 may include any suitable type of memory media or storage media, such as ROM, PROM, RAM, SRAM, or Flash memory. In the context of this discussion, the CRM 124 is implemented as hardware-based storage media, which does not include transitory signals or carrier waves. The CRM 124 of the base station 104 may store firmware, an operating system, or applications of the base station 104 as instructions, code, or other information. The instructions or code can be executed by the processor 122 to implement various functionalities of the base station 104, such as to manage connectivity or parameters of the wireless connection 106 with the user device 102. In this example, the CRM 124 also stores processor-executable code or instructions for implementing the resource manager 126 and the decoding module 128 of the base station 104.

In some aspects, the resource manager 126 of the base station 104 is implemented to perform various functions associated with allocating physical access (e.g., resource blocks) or communication resources available to the base station 104. The physical access, such as an air interface of the base station 104, may be partitioned or divided into various units (e.g., frames) of one or more of bandwidth, time, symbols, or spatial layers. For example, within a framework of a 5G NR protocol, the resource manager 126 can allocate bandwidth and time intervals of access in resource blocks, each of which may be allocated in whole, or in part, to one or more channels for communicating with the user device 102. The resource blocks may include multiple subcarriers, each of which spans a portion of a frequency domain of the resource blocks. The subcarriers may be further divided into resource elements, or OFDM symbols, each of which spans a portion of a time domain of the subcarriers. Consequently, a resource block includes multiple OFDM symbols that can be grouped into subcarriers with other OFDM symbols having a common frequency.

In some aspects, the decoding module 128 decodes data received from the user device 102. In context of user device-initiated low-latency data transmissions, the decoding module may determine that the low-latency data is received without an associated uplink grant. The decoding module 128 may identify the low-latency data by comparing the low-latency data with data expected to be received over the OFDM symbols. Additionally or alternatively, the decoding module 128 may receive a preemption indication, which identifies one or more of the OFDM symbols or the spatial layers over which the low-latency data is transmitted. The decoding module 128 can then decode the low-latency data.

The base station 104 receives the request for an uplink grant, transmits the uplink grant, and receives the low-latency data via the communication module 130. The communication module 130 includes a receiver, a transmitter, and associated circuitry or other components for communicating with the user device 102 via the wireless medium. The communication module 130 may be configured to communicate over a frequency range of the wireless medium and over multiple spatial layers. In some cases, the communication module 130 includes, or is coupled with, multiple hardware-based transceivers and antenna arrays that are configured to establish and manage wireless connections with multiple user devices. The base station 104 may transmit any suitable data or information to the user device 102 through the downlink 110, such as a schedule of allocated communication resources, downlink pilots, application data, wireless connection status information, or wireless connection control information.

Figure 2:
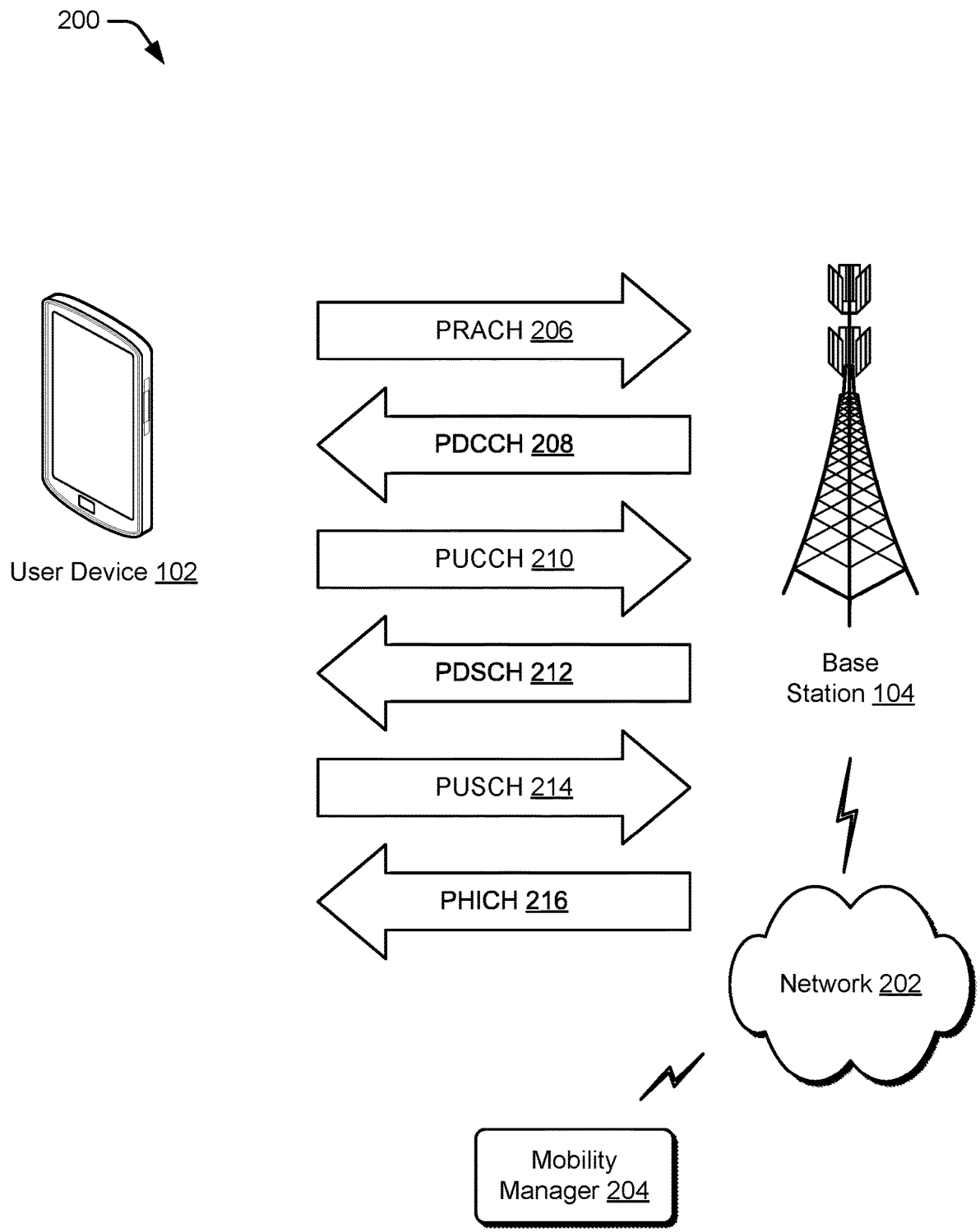
FIG. 2 illustrates an example networking environment in which the user device and base station may communicate in accordance with one or more aspects of user device-initiated low-latency data transmissions.

FIG. 2 illustrates an example networking environment 200 in which a user device and a base station may communicate in accordance with one or more aspects of user device-initiated low-latency data transmissions can be implemented. The network environment includes respective instances of the user device 102 and the base station 104, which provides a wireless network with which the user device 102 and other user devices may associate. Through the wireless network, the base station 104 may enable or provide access to other networks or resources, such as a network 202 (e.g., the Internet) connected via a backhaul link (e.g., fiber network). Alternately or additionally, the networking environment 200 may include other base stations or a mobility manager 204, such as a mobility management entity (MME) or an access and mobility management function (AMF), to provide an area wide wireless network, such as a 5G NR network and associated data services.

The user device 102 and/or the base station 104 may communicate through any suitable type or combination of channels, message exchanges, or network management procedures. In this example, the wireless connection 106 includes one or more channels including a physical random access channel (PRACH) 206, a physical downlink control channel (PDCCH) 208, a PUCCH 210, a physical downlink share channel (PDSCH) 212, a physical uplink share channel (PUSCH) 214, or a physical hybrid automatic repeat request (HARQ) indicator channel (PHICH).

The user device 102 can transmit a request for an uplink or downlink grant via the PRACH 206. The user device 102 may also use the PRACH 206 to request that the base station 104 establish the wireless connection 106 with the user device 102. Generally, the PRACH 206 is a low-bandwidth channel for carrying small amounts of data. In the context of user device-initiated low-latency data transmissions, the user device 102 may transmit one or more of low-latency data or a preemption indication over resources of the PRACH 206.

The PDCCH 208 can be used by the base station 104 to communicate downlink control information (DCI) and/or a radio resource control (RRC) messages to the user device 102. In some aspects, the DCI includes identification of resource elements to be used for communication of data to the user device 102. The DCI may also include a modulation scheme and coding/decoding information for the user device 102 to access the data communicated to the user device 102.

The PUCCH 210 may be useful to transmit, to the base station 104, one or more of HARQ acknowledge/not acknowledge (ACK/NACK), channel quality indicators (CQI), multiple-input-multiple-output (MIMO) feedback such as a rank indicator (RI) or a precoding matrix indicator (PMI), scheduling requests for uplink transmission, or binary phase-shift keying (BPSK) or quadrature phase-shift keying (QPSK) for PUCCH modulation. In the context of user device-initiated low-latency data transmissions, the user device 102 may transmit one or more of low-latency data or a preemption indication over resources of the PUCCH 210.

The PDSCH 212 may be used by the base station 104 to transmit application data to the user device 102. The PDSCH 212 may be dynamically sized based on a request for data by the user device 102 or a determination by the base station 104 to transmit application data to the user device 102.

The user device 102 may send additional data or other information to the base station 104 via the PUSCH 214. The PUSCH 214 may include radio resource control (RRC) communications, uplink control information (UCI) messages, and application data. The PUSCH 214 is typically the channel on which the user device 102 transmits regularly-scheduled application data to the base station 104. In the context of user device-initiated low-latency data transmissions, the user device 102 may transmit one or more of low-latency data or a preemption indication over resources of the PUSCH 214.

The base station 104 may send additional data to the user device 102 via a physical HARQ indicator channel (PHICH) 216. The PHICH 216 includes acknowledgements or lack of acknowledgements for data received from the user device 102 via the PUSCH 214.

In the context of user device-initiated low-latency data transmissions, the user device 102 may transmit a request for an uplink grant, to transmit first data, via one of the PRACH 206 or the PUCCH 210. The base station 104 transmits an uplink grant, for transmitting the first data, to the user device 102 via the PDCCH 208. After transmitting the request for the uplink grant, the user device 102 identifies second data to transmit to the base station 104. The user device 102 determines that the second data is low-latency data and that the first data is standard data or high-latency data, by the preemption module 118, for example. Based on the determination of a type of data of the first data and the second data, the preemption module 118 may identify the second data as a higher priority for transmission than a priority for transmission of the first data. The user device 102 then autonomously determines to preempt transmission of a portion of the first data with a transmission of the second data. The user device 102 carries out the transmission via communication resources, such as one or more OFDM symbols, of the PUSCH 214, PRACH 206, or the PUCCH 210. The transmission of the second data may not require all of the resources of the resource grant, so the user device 102 may also transmit a portion of the first data on other communication resources of the PUSCH 214. The user device 102 may also transmit a preemption indication to the base station 104, by a UCI of the PUCCH, for example. The user device 102 may transmit the preemption indication on different frequencies than the second data, different OFDM symbols than the second data, or both. The preemption indication may indicate to the base station 104 that the portion of the first data is rate-matched around the low-latency, second data. More specifically, the preemption indication may identify one or more of frequency resources, time resources, or spatial resources over which the second data is transmitted. The base station 104 may use the preemption indication to decode the second data and the first data, by the decoding module 128, for example.

In other implementations of user device-initiated low-latency data transmissions, the user device 102 determines to transmit low-latency data without an uplink grant for the transmission. The user device 102 may transmit the low-latency data over resources allocated to a random access channel or another channel allocated to another user device.

However, transmitting over these already allocated resources may result in a conflict with other data transmitted on the already allocated resources. The user device 102 may apply user-specific spreading to push the low-latency data though this conflict such that the base station 104 can identify the message, even if a signal-to-noise ratio is low. Additionally or alternatively, the user device 102 may also identify the user device 102 as a source of the low-latency data.

Additionally or alternatively, the user device 102 may autonomously transmit a preemption indication over the PUCCH 210 or the PUSCH along with the low-latency data. In such implementations, the user device 102 selects frequency resources, time resources, and beam resources for transmitting the low-latency data. The preemption indication indicates the resources over which the low-latency data is transmitted. Additionally, the preemption indication may identify the user device 102 as a source of the low-latency data.

In some implementations, the user device 102 and the base station 104 agree upon a compression scheme to reduce an amount of bandwidth required for transmitting the second data. For example, the user device 102 and the base station 104 agree upon a low-latency uplink packet data convergence protocol (PDCP) such that overhead, such as an address of a destination machine or contextual data, can be eliminated from a physical layer transmission. In other examples, before transmission of the low-latency data, the user device 102 and the base station 104 agree on a predetermined low-latency data container for transmitting low-latency data. The low-latency data container includes contextual information into which the low-latency data, such as sensor data, can be inserted to form a complete message. The contextual information may include directions for using the low-latency data, such as a destination address. The user device 102 may then transmit a portion of a low-latency message, which the base station 104 combines with the predetermined low-latency data container to form the low-latency message. In this way, an amount of bandwidth for transmitting the low-latency message is reduced and only a portion of the message is transmitted as the low-latency data. The low-latency data may identify a corresponding data container of a plurality of predetermined low-latency data containers that had been agreed upon by the user device 102 and the base station 104.

When an amount of bandwidth required for transmitting the second data is small, the user device 102 may transmit the second data on the PUCCH 210, or another low-bandwidth channel, of the wireless connection 106. In these implementations, the low-latency data may be transmitted with formatting that is different from a standard transmission over the PUCCH 210.

Figure 3:
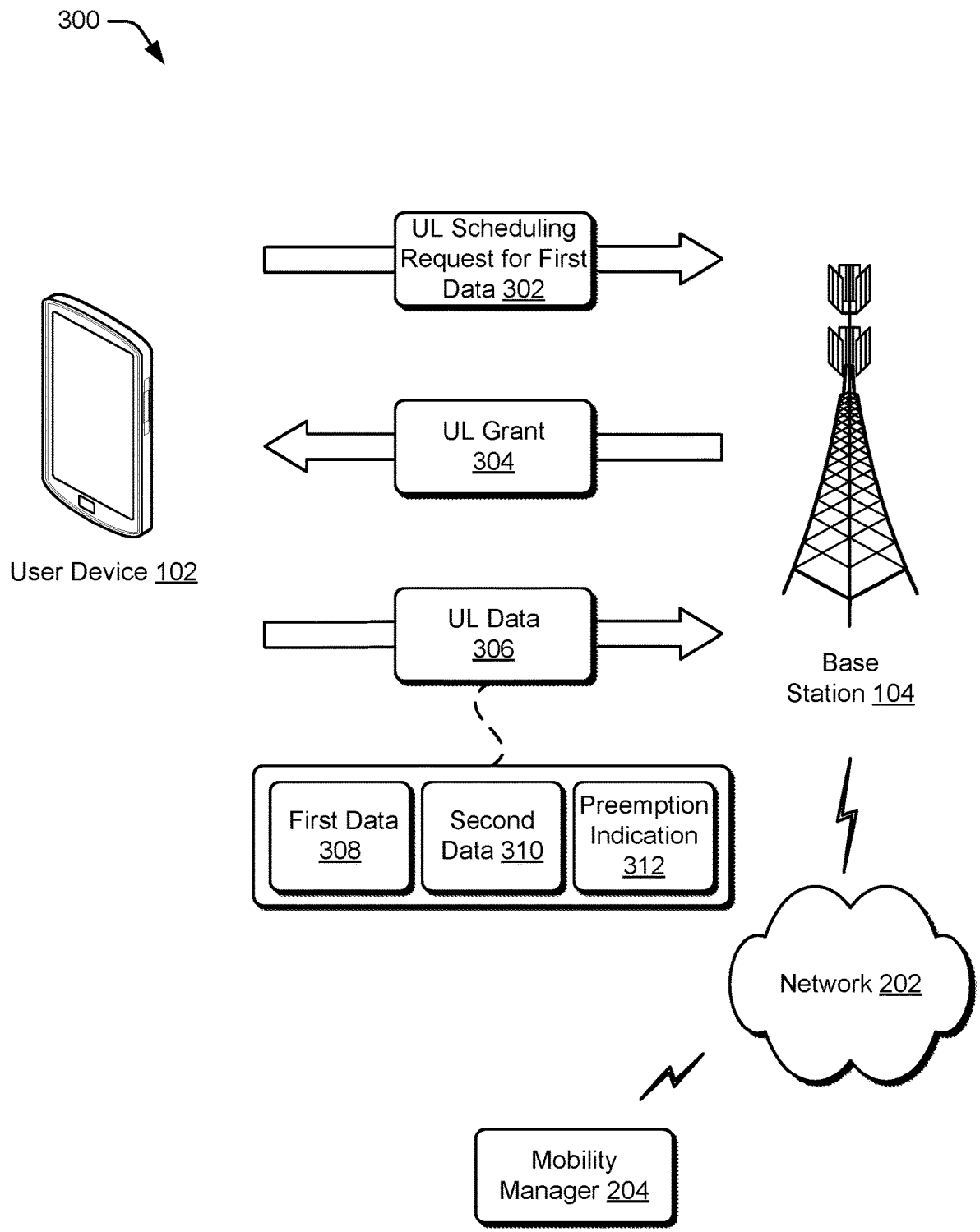
FIG. 3 illustrates another example networking environment in which the user device and base station may communicate in accordance with one or more aspects of user device-initiated low-latency data transmissions.

FIG. 3 illustrates an example networking environment 300 in which a user device and a base station may communicate in accordance with one or more aspects. The networking environment 300 includes respective instances of the user device 102, the base station 104, the network 202, and the mobility manager 204.

In this example, the user device 102 transmits, to the base station 104, an uplink (UL) scheduling request for first data 302. The base station 104 receives the uplink scheduling request for first data 302 over a channel of the wireless connection 106, such as the PRACH 206 or the PUCCH 210. The base station 104 determines availability of resources for an uplink from the user device 102 and selects resources for an uplink (UL) grant 304. The uplink grant 304, identifying resources allocated to the user device 102 for transmitting, is then transmitted to the user device 102 over a channel of the wireless connection 106, such as the PDCCH 208.

Between a time of transmission of the uplink scheduling request for first data and transmitting uplink data 306, the user device 102 determines to transmit low-latency data. The uplink data includes first data 308, for which the uplink grant 304 allocated resources, along with second data 310, which includes the low-latency data. The uplink data 306 may also include a preemption indication 312 that indicates, to the base station 104, that the uplink data 306 includes the second data 310, for which the uplink grant 304 was not intended.

Figure 4:
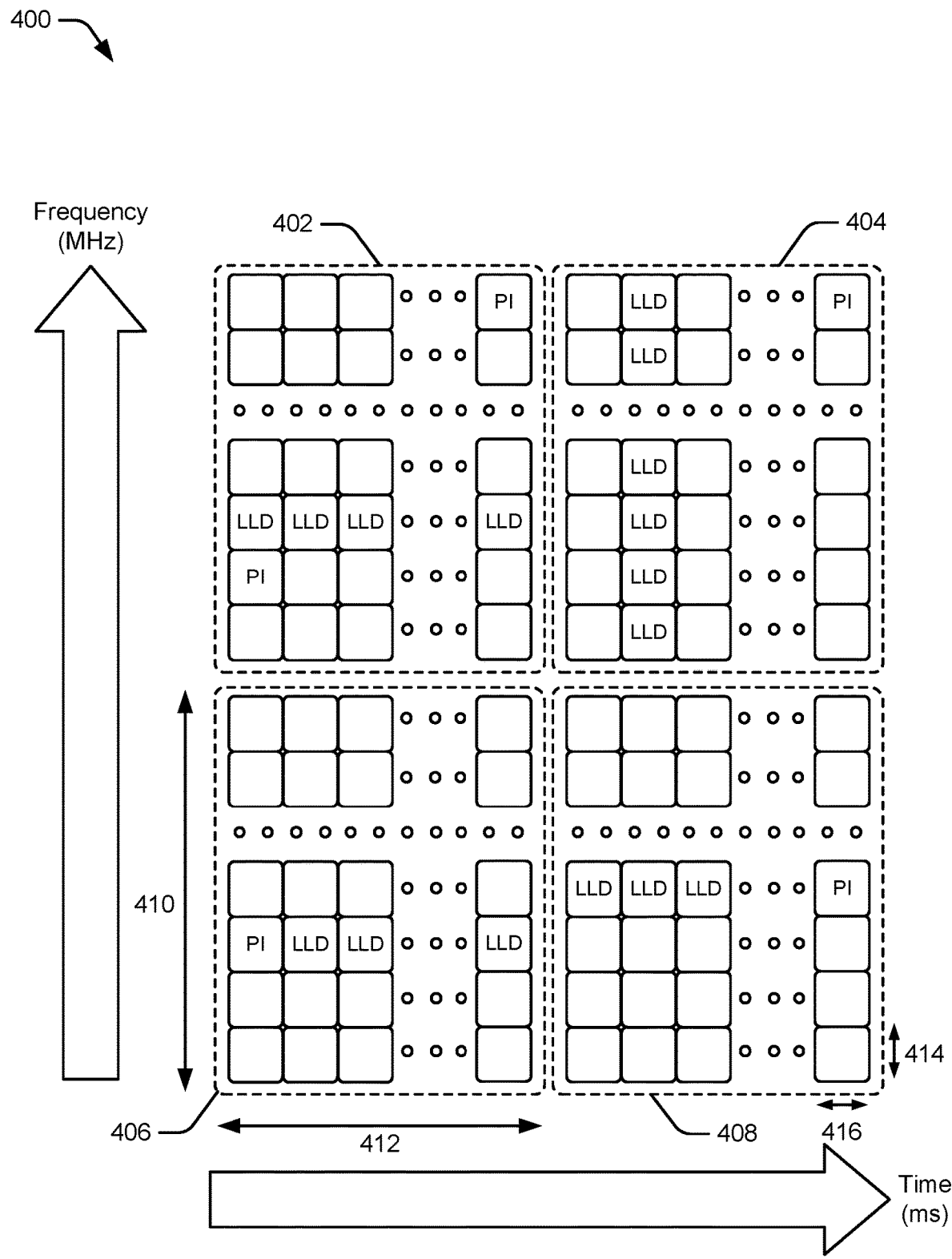
FIG. 4 illustrates an example set of resources available for communication between the user device and the base station.

FIG. 4 illustrates an example set 400 of resources available to the base station 104 for communication with the user device 102 over the wireless connection 106. The set 400 of resources spans a frequency-time domain that includes multiple resource blocks 402, 404, 406, and 408. The resource blocks of the set 400, as defined by a communication protocol or standard, span a specified frequency range 410 and a time interval 412. The resource blocks 402, 404, 406, and 408 include resources elements, shown as blocks within the resources blocks 402, 404, 406, and 408, spanning one subcarrier 414 and one OFDM symbol 416. Resource blocks may be configured to include a quantity and spacing of resource elements, subcarriers, and OFDM symbols based on a protocol of the wireless connection 106. In an LTE protocol, for example, a resource block includes 7 OFDM symbols, which collectively span a 0.5 second interval, and 12 subcarriers, which collectively span 180 kHz. In a 5G NR protocol, for another example, the resource block can include any quantity of OFDM symbols or subcarriers. Further, a 5G NR resources block may dynamically space subcarriers, dynamically set a quantity of OFDM symbols, or both.

Several of the resource elements are shown carrying low-latency data (LLD) in various distributions within an associated resource block. For example, the resources blocks 402, 406 and 408 include low-latency data carried on resource elements of a common subcarrier. The resources block 404 includes low-latency data carried on resource elements of a common OFDM symbol.

Several others of the resource elements are shown carrying a preemption indication (PI) in various distributions within an associated resource block. For example, the resource block 402 includes preemption indications transmitted over subcarriers that are different from the subcarrier over which the low-latency data is transmitted. Further, the preemption indications are transmitted over a same OFDM symbol as at least a portion of the low-latency data to which the preemption indications correspond. The resource blocks 406 and 408 include preemption indications that are transmitted on a same subcarrier as low-latency data. In the resource block 406, the preemption indication is transmitted before the low-latency data. Conversely, in the resource block 408, the preemption indication is transmitted after the low-latency data. Additionally or alternatively, a preemption indication, such as that of the resource block 404, may correspond to one or more transmissions of low-latency data of a different resource block, such as those of any of the resource blocks 402, 406, or 408.

Additionally or alternatively, the base station 104 may schedule resources for the user device 102 to transmit low-latency data. For example, the base station 104 may schedule, for transmissions of low-latency data, a subcarrier of a resources block, such as the subcarrier of the resource block 402 that includes the resource elements carrying the low-latency data. Alternatively, the base station 104 may schedule, for transmissions of low-latency data, one or more OFDM symbols, such as the OFDM symbol of the resource block 404 that includes the resource elements carrying the low-latency data. In some implementations involving scheduling resources for transmission of low-latency data, the base station 104 may also schedule the resources for transmission of other data. For example, the resources may also be scheduled for a random access channel or an uplink channel of the user device 102 or another user device. In these implementations, the base station 104 may monitor the scheduled resources for low-latency data that preempts transmission of the other data. The base station 104 may identify the low-latency data as preempting the other data based on a preemption indication or a comparison of the low-latency data with expected elements of the other data. For example, the expected elements may include a prefix, header, or data format.

Figure 5:
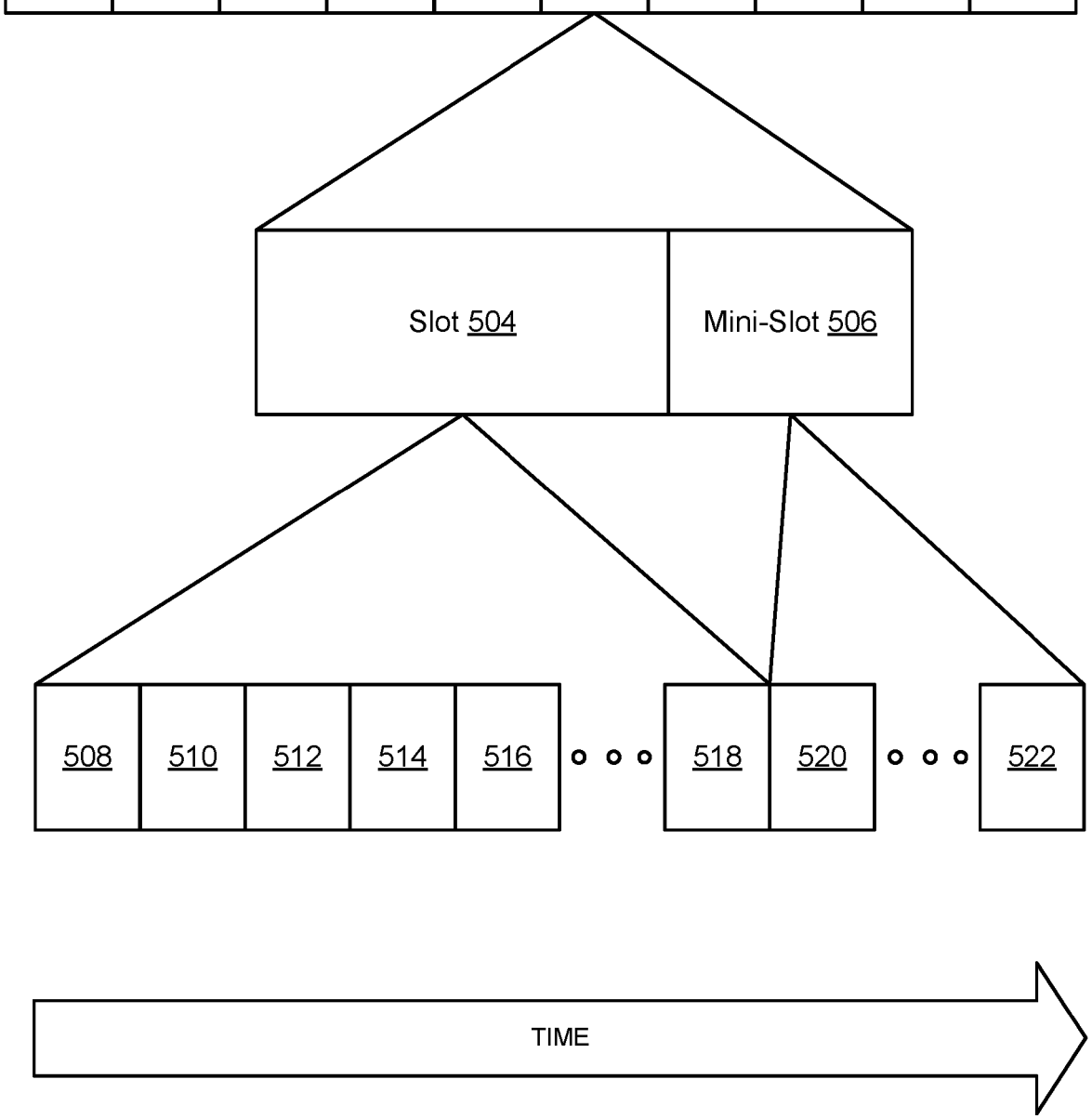
FIG. 5 illustrates an example data frame that is available for communication between the user device and the base station.

FIG. 5 illustrates a data frame 500 that is available for communication between the user device 102 and the base station 104 over the wireless connection 106. The data frame 500 includes multiple subframes, such as a subframe 502. The subframe 502 includes a slot 504 and a mini-slot 506. The slot 504 includes OFDM symbols 508, 510, 512, 514, 516, and 518. The mini-slot 506 includes OFDM symbols 520 and 522. The slot 504 includes a standard quantity of OFDM symbols, as defined in a protocol of the wireless connection. The mini-slot 506 includes fewer OFDM symbols than the standard quantity of OFDM symbols.

In the context of user device-initiated low-latency data transmissions, the user device 102 may transmit the low-latency data on one or more OFDM symbols 520 or 522 of the mini-slot 506. In some implementations, the base station 104 schedules mini-slots for the user device 102 to autonomously transmit low-latency data without an uplink grant. By scheduling mini-slots rather than standard slots, a bandwidth allocated for transmissions without an uplink grant is smaller. Therefore, if the user device 102 has no low-latency data to transmit, less bandwidth of the wireless connection 106 will be left unused. Additionally, low-latency data may be transmitted according to a compression scheme and may require fewer OFDM symbols than a standard quantity of OFDM symbols to transmit.

Figure 6:
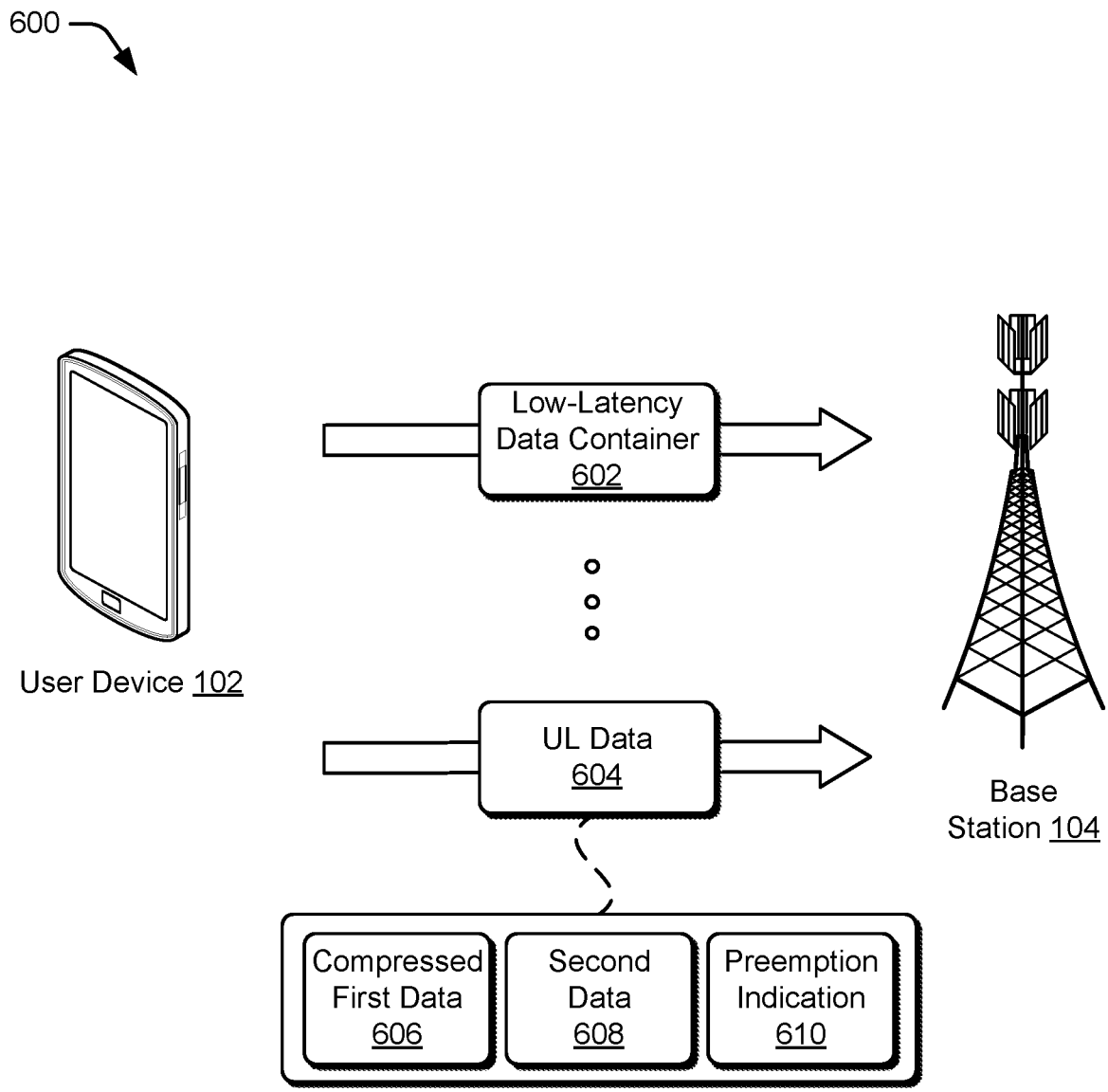
FIG. 6 illustrates another example networking environment in which the user device and the base station may communicate in accordance with one or more aspects of user device-initiated low-latency data transmissions.

FIG. 6 illustrates another example networking environment in which the user device 102 and the base station 104 may communicate in accordance with one or more aspects of user device-initiated low-latency data transmissions. The user device 102 transmits a low-latency data container 602 to the base station 104. The base station 104 can locally store the low-latency data container 602, or transmit the low-latency data container 602 to a storage media to which the base station 104 has access. The low-latency data container 602 may conform to a PDCP scheme to reduce an amount of overhead needed to transmit low-latency data at a later time. The user device 102 may also transmit additional low-latency data containers such that the base station 104 has access to multiple low-latency data containers.

The user device 102 then transmits uplink data 604 to the base station 104. The uplink data 604 includes compressed first data 606. The uplink data 604 may also include one or both of second data 608 or a preemption indication 610. The base station 104 may combine the compressed first data 606 with the low-latency data container 602 to form a complete message. For example, the low-latency data container 602 may include one or more of an identification of the user device 102, context for the compressed first data, or a delivery address for the complete message. Transmitting the low-latency data container 602 before the user device 102 determines to transmit the complete message reduces an amount of data that is transmitted as low-latency data over the wireless connection 106. This can reduce a quantity of resources that are allocated for low-latency data transmissions. Additionally or alternatively, this can reduce an amount of standard or high-latency data that is preempted for transmitting the low-latency data.

The second data 608 may include other data for which the base station 104 has already transmitted an uplink grant. The second data 608 may be rate-matched around the transmission of the compressed first data 606. As discussed herein, the preemption indication 610 may include an indication that the uplink data 604 includes the compressed first data 606. The preemption indication 610 may further indicate over which OFDM symbols, frequency bandwidths, or spatial resources the compressed first data 606 is transmitted by the user device 102.

Techniques for User Device-Initiated Low-Latency Data Transmission

Figure 7:
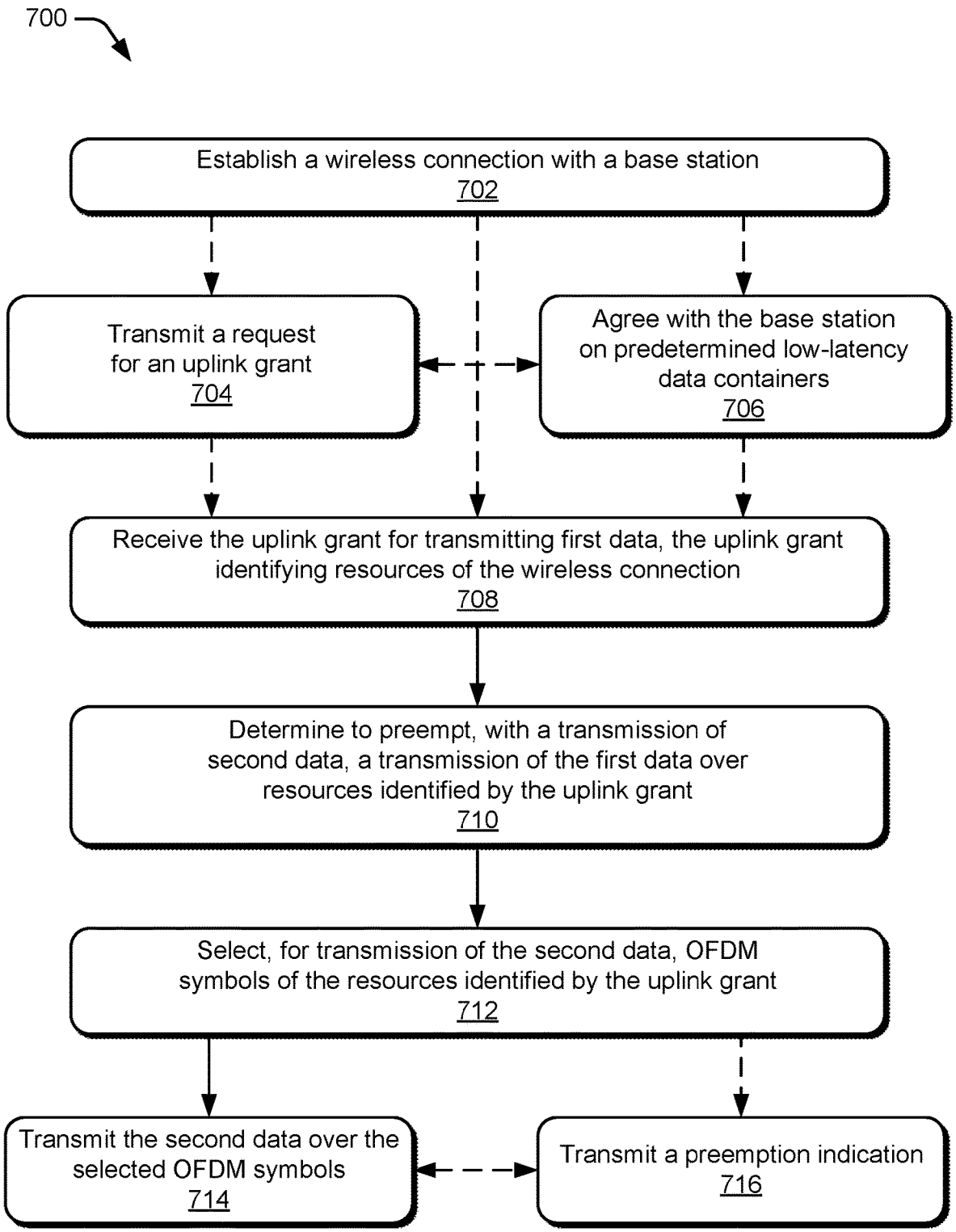
FIG. 7 illustrates an example method performed by the user device for user device-initiated low-latency data transmissions.
Figure 8:
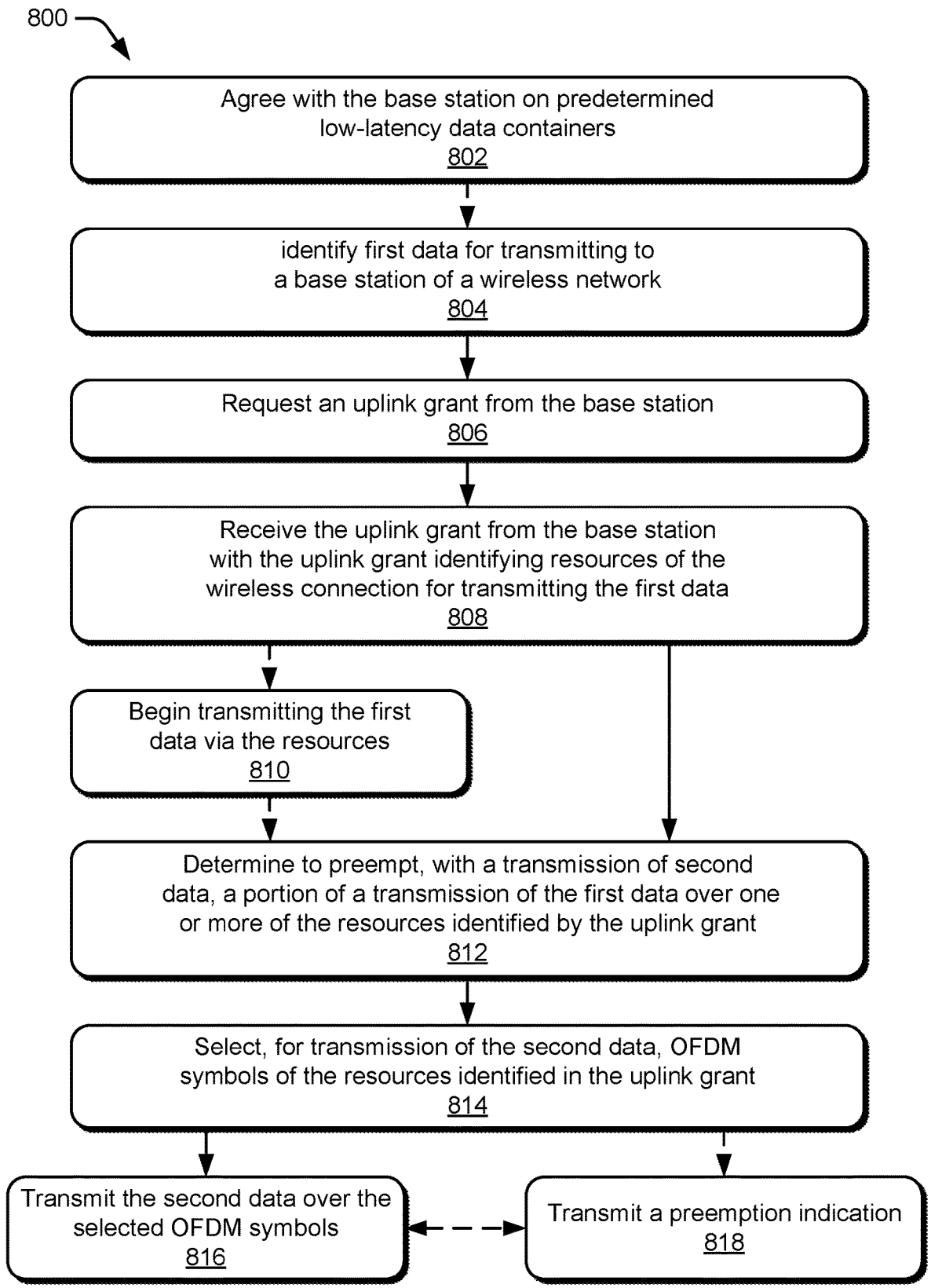
FIG. 8 illustrates another example method performed by the user device for user device-initiated low-latency data transmissions.
Figure 9:
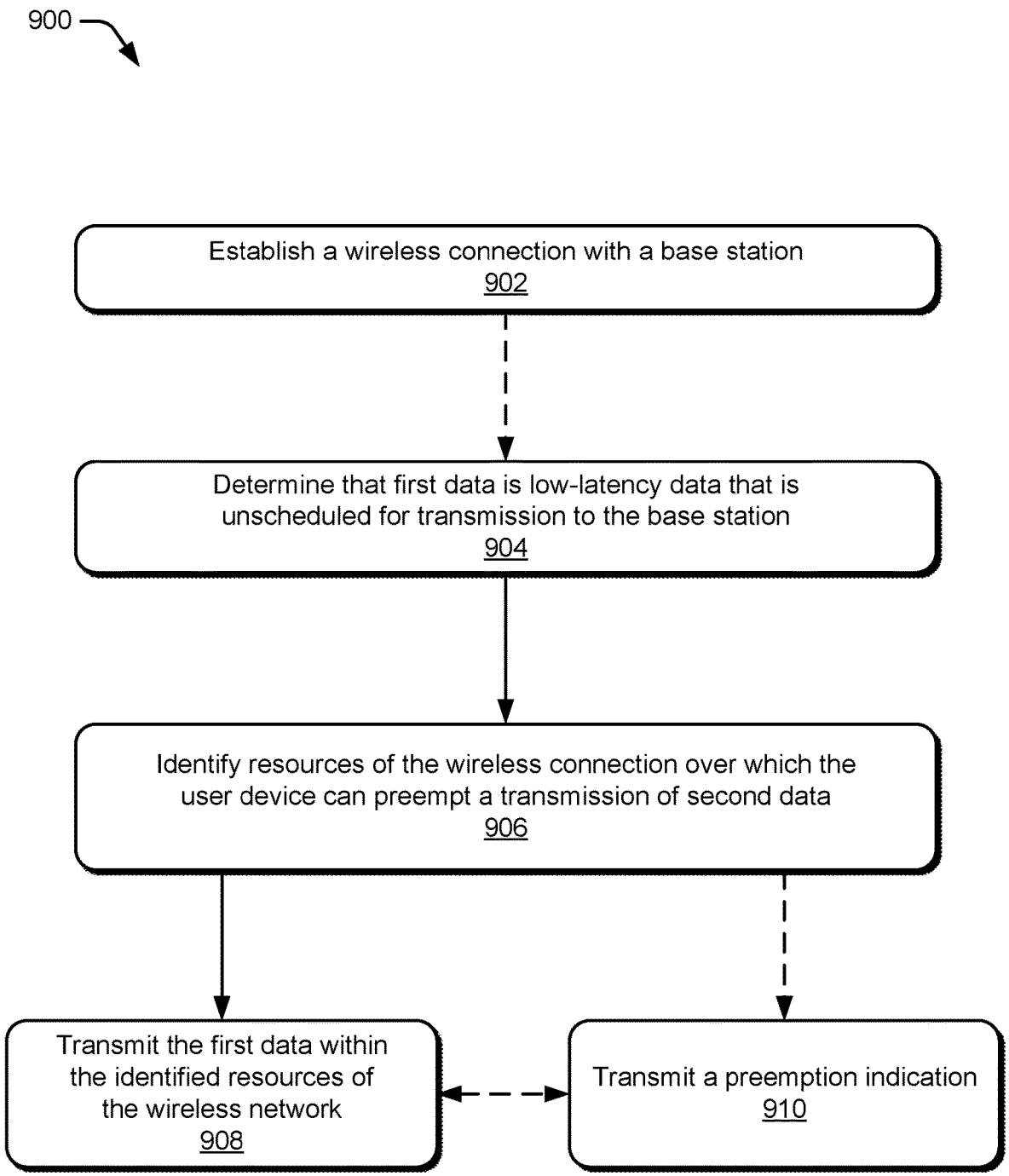
FIG. 9 illustrates another example method performed by the user device for user device-initiated low-latency data transmissions.

FIGS. 7-9 depict methods for implementing user device-initiated low-latency data transmissions. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-6, reference to which is made for example only. The techniques are not limited to performance by one entity or multiple entities operating on one device, or those described in these figures.

FIG. 7 illustrates an example method 700 performed by a user device for user device-initiated low-latency data transmissions. The method 700 includes operations that may be performed by a communication scheduler, such as the communication scheduler 116, a preemption module, such as the preemption module 118, and a communication module, such as the communication module 120. In some aspects, operations of the method 700 may reduce a latency for transmitting low-latency data over a wireless connection of a wireless network.

At operation 702, the user device establishes a wireless connection with a base station. For example, the user device 102 established the wireless connection 106 with the base station 104. This may be performed via a transceiver of the user device 102 based on a protocol of a radio access technology associated with the wireless connection. For example, the user device 102 may request, via the PRACH 206, access to a wireless network provided by the base station 104. The base station 104 then transmits a communication schedule via the PDCCH 208.

At optional operation 704, the user device transmits a request for an uplink grant. For example, the user device 102 transmits the uplink scheduling request for first data 302 to the base station 104.

At optional operation 706, the user device agrees with the base station on one or more predetermined low-latency data containers. For example, the user device 102 transmits the low-latency data container 602 to the base station 104. Alternatively, the base station 104 may transmit or identify a low-latency data container to the user device 102.

At operation 708, the user device receives the uplink grant for transmitting first data via resources of the wireless connection. The uplink grant identifies resources of the wireless connection with the base station. For example the uplink grant 304 identifies one or more of the resource blocks 402, 404, 406, or 408 for the user device 102 to transmit the first data.

At operation 710, the user device determines to preempt, with a transmission of second data, a transmission of the first data over resources identified by the uplink grant. The second data, which is not included in the first data, may be low-latency data. For example, the communication scheduler 116 identifies second data for transmitting to the base station 104. The preemption module 118 then determines that the second data is low-latency data, for which a delay for requesting and receiving an uplink grant is not tolerable or not desirable. The user device 102 may determine to transmit the second data after determining to transmit the first data, after transmitting the request for the uplink grant, after receiving the uplink grant, or after beginning transmission of the first data.

At operation 712, the user device selects, for transmission of the second data, one or more OFDM symbols of the resources identified by the resource grant, where the one or more OFDM symbols are already scheduled for transmission of a portion of the first data. For example, the preemption module 118 determines that the first data is standard data or high-latency data and can therefore be punctured for transmission of the second data. The preemption module 118 may select one or more OFDM symbols based on identification of preferred resources for preemption, which identification is provided by the base station 104.

At operation 714, the user device 102 transmits the second data over the selected one or more OFDM symbols. For example, the user device 102 transmits the second data over the resources of the set 400 of resources identified as carrying the low-latency data.

At optional operation 716, the user device transmits a preemption indication. The preemption indication can be transmitted before, during, or after transmission of the second data. For example, the user device 102 transmits the preemption indication 312 to the base station 104. The preemption indication may be transmitted via the PUCCH 210, the PUSCH 214, or the PRACH 206.

FIG. 8 illustrates another example method 800 performed by a user device for user device-initiated low-latency data transmissions. The method 800 also includes operations that may be performed by a communication scheduler, such as the communication scheduler 116, a preemption module, such as the preemption module 118, and a communication module, such as the communication module 120. Operations of the method 800 may also reduce a latency for transmitting low-latency data over a wireless connection of a wireless network.

At optional operation 802, the user device agrees with the base station on one or more predetermined low-latency data containers. For example, the user device 102 transmits the low-latency data container 602 to the base station 104 prior to determining to transmit the low-latency data. Alternatively, the base station 104 may transmit or identify a low-latency data container to the user device 102.

At operation 804, the user device identifies first data for transmitting to a base station of a wireless network. For example, the communication scheduler 116 identifies the first data 308 for transmitting to the base station 104 over the wireless connection 106.

At operation 806, the user device requests an uplink grant 704 from the base station. For example, the user device 102 transmits the uplink scheduling request for first data 302 to the base station 104.

At operation 808, the user device receives the uplink grant from the base station with the uplink grant identifying resources over the wireless connection for transmitting first data. For example the uplink grant 304 identifies one or more of the resource blocks 402, 404, 406, or 408 to the user device 102 for transmitting the first data.

At optional operation 810, the user device begins transmitting the first data via the resources identified in the uplink grant. For example, the user device 102 begins transmitting the first data 308 via the resource block 404.

At operation 812, the user device determines to preempt, with a transmission of second data, a transmission of the first data over one or more of the resources identified by the uplink grant. The second data may be low-latency data that is not included in the first data scheduled for transmission to the base station. For example, the preemption module 118 identifies the second data 310 as low-latency data and the first data 308 as standard data or high-latency data. The first data 308 does not include the second data 310, which means that the uplink grant 304 is not intended for the user device 102 to transmit the second data 310. Therefore, transmitting the second data 310 over the one or more resources identified by the uplink grant would require preempting a transmission of a portion of the first data 308. The user device 102 may determine to transmit the second data after determining to transmit the first data, after transmitting the request for the uplink grant, after receiving the uplink grant, or after beginning transmission of the first data.

At operation 814, the user device selects, for transmission of the second data, one or more OFDM symbols of the resources identified in the uplink grant for transmission of the first data. For example, the preemption module 118 or the communication scheduler 116 identify a second OFDM symbol of the resource block 404 to transmit the second data. The preemption module 118 may determine that the first data is standard data or high-latency data and can therefore be preempted for transmission of the second data. The preemption module 118 may select one or more OFDM symbols based on identification of preferred resources for preemption, which identification is provided by the base station 104.

At operation 816, the user device 102 transmits the second data over the selected one or more OFDM symbols. For example, the user device 102 transmits the second data over the resource elements of the set 400 of resources identified as carrying the low-latency data.

At optional operation 818, the user device transmits a preemption indication. The preemption indication can be transmitted before, during, or after transmission of the second data. For example, the user device 102 transmits the preemption indication 312 to the base station 104. The preemption indication may be transmitted via the PUCCH 210, the PUSCH 214, or the PRACH 206.

FIG. 9 illustrates an example method 900 performed by a user device for user device-initiated low-latency data transmissions. The method 900 includes operations that may be performed by a communication scheduler, such as the communication scheduler 116, a preemption module, such as the preemption module 118, and a communication module, such as the communication module 120. In some aspects, operations of the method 900 may reduce a latency for transmitting low-latency data over a wireless connection of a wireless network.

At optional operation 902, the user device establishes a wireless connection with a base station of a wireless network. For example, the user device 102 established the wireless connection 106 with the base station 104. This may be performed via a transceiver of the user device 102 based on a protocol of a radio access technology associated with the wireless connection. For example, the user device 102 may request, via the PRACH 206, access to a wireless network provided by the base station 104. The base station 104 then transmits a communication schedule via the PDCCH 208.

At operation 904, the user device determines that first data is low-latency data, which is unscheduled for transmission to the base station. For example, the communication scheduler 116 identifies the first data for transmitting to the base station 104. The preemption module 118 then determines that the first data is low-latency data, for which a delay for requesting and receiving an uplink grant is not tolerable.

At operation 906, the user device identifies, for transmission of the second data, resources of the wireless network over which the user device can preempt a transmission of second data. For example, the preemption module 118 determines that the identified resources of the wireless network are allocated for transmitting standard data or high-latency data and can therefore be punctured for transmission of the first data. Additionally or alternatively, the preemption module 118 may select one or more OFDM symbols based on identification of preferred resources for preemption, which identification is provided by the base station 104. The identified resources may be included in the wireless connection or may be included in a wireless connection with another user device. Alternatively, the identified resources may be unallocated resources of the wireless network.

At operation 908, the user device 102 transmits the first data over the identified resources of the wireless network. For example, the user device 102 transmits the first data over the resources of the set 400 of resources identified as carrying the low-latency data.

At optional operation 910, the user device transmits a preemption indication. As discussed herein, the preemption indication can be transmitted before, during, or after transmission of the second data. For example, the user device 102 transmits the preemption indication 312 to the base station 104. The preemption indication may be transmitted via the PUCCH 210, the PUSCH 214, or the PRACH 206.

Although techniques using, and apparatuses for implementing, user device-initiated low-latency data transmissions have been described in language specific to features and/or methods, it is to be understood that the subject of the appended claims is not necessarily limited to the specific features or methods described. Rather, the specific features and methods are disclosed as example ways in which user device-initiated low-latency data transmissions can be implemented.

What is claimed is:

1. A method for low-latency data transmissions initiated by a user device, the method comprising:
    receiving, via a transceiver of the user device and from a base station of a wireless network, an uplink grant identifying resources of a wireless connection for transmitting first data;
    determining to preempt-a transmission of the first data with a transmission of second data using one or more of the resources identified in the uplink grant, the second data:
        being low-latency data,
        not having an associated uplink grant, and
        not being a portion of the first data;
    selecting one or more orthogonal frequency-division multiplexing (OFDM) symbols for the transmission of the second data from the resources identified in the uplink grant for the first data;
    transmitting, via the transceiver of the user device and to the base station, the second data using the selected one or more OFDM symbols from the uplink grant for the first data; and
    transmitting, via the transceiver of the user device and to the base station, a preemption indication indicating to the base station:
        that the second data has been, or will be, transmitted over the selected one or more OFDM symbols from the uplink grant for the first data; and
        one or more spatial layers over which the user device has, or will, transmit the second data.

2. The method as recited in claim 1, wherein the user device transmits the preemption indication to the base station before transmitting the second data to the base station.

3. The method as recited in claim 1, wherein the user device transmits the preemption indication to the base station after transmitting the second data to the base station.

4. The method as recited in claim 1, wherein the user device transmits the preemption indication to the base station via an uplink control channel.

5. The method as recited in claim 1, wherein a number of the selected one or more OFDM symbols is less than a quantity of OFDM symbols in a standard slot of the wireless connection.

6. The method as recited in claim 1, further comprising initiating a transmission, via the transceiver of the user device, of the first data to the base station.

7. The method as recited in claim 6, wherein the transmission of the first data is rate matched around the transmission of the second data.

8. The method as recited in claim 7, wherein the preemption indication further indicates to the base station that transmission of the first data is rate matched around the transmission of the second data.

9. The method as recited in claim 1, wherein:
    the second data is transmitted over a plurality of spatial layers; and
    the preemption indication indicates the plurality of spatial layers.

10. A user device comprising:
    a processor;
    a hardware-based transceiver: and
    a computer-readable storage medium having stored thereon instructions that, responsive to execution by the processor, cause the processor to perform operations comprising:
        identifying first data to transmit to a base station of a wireless network;
        requesting, via the hardware-based transceiver, an uplink grant from the base station;
        receiving, via the hardware-based transceiver, the uplink grant from the base station, the uplink grant identifying resources of a wireless connection by which to transmit the first data;
        determining to preempt a transmission of the first data with a transmission of second data using one or more of the resources identified in the uplink grant for the first data, the second data:
            being low-latency data,
            not having an associated uplink grant, and
            not included in the first data;

selecting one or more orthogonal frequency-division multiplexing (OFDM) symbols of the resources identified in the uplink grant for the first data for use in transmitting the second data;

transmitting, via the hardware-based transceiver, the second data over the selected one or more OFDM symbols, the transmission of the second data preempting transmission of at least a portion of the first data over the selected one or more OFDM symbols; and transmitting, via the hardware-based transceiver, a preemption indication to the base station indicating:

that the second data has been, or will be, transmitted over the selected one or more OFDM symbols from the uplink grant for the first data; and one or more spatial layers over which the user device has, or will, transmit the second data.

11. The user device as recited in claim 10, wherein:

the operations further comprise agreeing with the base station on a predetermined low-latency data container for transmitting low-latency data; and transmitting the second data to the base station is performed by transmitting the second data in the predetermined low-latency data container.

12. The user device as recited in claim 10, wherein:

the operations further comprising transmitting, via the transceiver of the user device, at least a portion of the first data to the base station; and the transmission of the portion of the first data is rate matched around the transmission of the second data.

13. The user device as recited in claim 10, the second data is transmitted over a plurality of spatial layers; and the preemption indication indicates the plurality of spatial layers.

14. The user device as recited in claim 10, wherein the identified resources of the resource grant for the second data are part of a random access channel.

15. A user device comprising:

a processor;

a hardware-based transceiver; and a computer-readable storage medium having stored thereon instructions that, responsive to execution by the processor, cause the processor to perform operations comprising:

establishing, via the hardware-based transceiver, a wireless connection with a base station of a wireless network, the establishing the wireless connection comprising receiving a resource grant from the base station granting resources of the wireless connection over which the user device can transmit second data to the base station;

determining that first data is low-latency data, the first data being unscheduled for transmission to the base station;

identifying resources of the resource grant for the second data over which the user device can preempt a transmission of the second data;

transmitting, via the hardware-based transceiver, the first data to the base station over a plurality of spatial layers using the identified resources of the resource grant for the second data; and transmitting, via the hardware-based transceiver, a preemption indication to the base station indicating to the base station:

that the first data has been, or will be, transmitted over the identified resources of the resource grant for the second data; and the plurality of spatial layers over which the user device has, or will, transmit the first data.

16. The user device as recited in claim 15, wherein the identified resources of the resource grant for the second data are not part of an uplink shared channel.

17. The user device as recited in claim 16, wherein the identified resources of the resource grant for the second data are part of a random access channel.

18. The user device as recited in claim 16, wherein the identified resources of the resource grant for the second data are part of an uplink control channel.

19. The user device as recited in claim 15, wherein the identified resources comprise all of the resources of the resource grant for the second data.

20. The user device as recited in claim 15, wherein the operations further comprise:

initiating a transmission, via the hardware-based transceiver of the user device, of the second data to the base station.

* * * * *

UNITED STATES PATENT AND TRADEMARK OFFICE
CERTIFICATE OF CORRECTION

PATENT NO. : 10,785,792 B2  
APPLICATION NO. : 15/939088  
DATED : September 22, 2020  
INVENTOR(S) : Jibing Wang and Erik Richard Stauffer Page 1 of 1

It is certified that error appears in the above-identified patent and that said Letters Patent is hereby corrected as shown below:

In the Claims

Column 15, Line 61, Claim 1 after "to" before "transmission" delete "preempt-a" insert --preempt a--

Signed and Sealed this  
Twentieth Day of October, 2020

Andrei Iancu  
*Director of the United States Patent and Trademark Office*